US012672006B2

(12) United States Patent
Iustin

(10) Patent No.: US 12,672,006 B2
(45) Date of Patent: Jun. 30, 2026

(54) AD HOC VEHICLE NETWORK SYSTEM

(71) Applicant: VOLVO TRUCK CORPORATION,
Gothenburg (SE)

(72) Inventor: Roman Iustin, Mölnlycke (SE)

(73) Assignee: VOLVO TRUCK CORPORATION,
Gothenburg (SE)

( * ) Notice: Subject to any disclaimer, the term of this
patent is extended or adjusted under 35
U.S.C. 154(b) by 4 days.

(21) Appl. No.: 18/165,004

(22) Filed: Feb. 6, 2023

(65) Prior Publication Data

US 2023/0254705 A1 Aug. 10, 2023

(30) Foreign Application Priority Data

Feb. 8, 2022 (EP) ..................................... 22155592

(51) Int. Cl.
*H04W 16/18* (2009.01)
*G05D 1/00* (2024.01)
(Continued)

(52) U.S. Cl.
CPC .......... *H04W 16/18* (2013.01); *H04B 17/309*
(2015.01); *H04W 24/08* (2013.01);
(Continued)

(58) Field of Classification Search
CPC ... H04W 16/18; H04W 24/08; H04W 84/005;
H04B 17/309; G05D 1/0257; G05D
1/0278
See application file for complete search history.

(56) References Cited

U.S. PATENT DOCUMENTS 7,720,026 B2     5/2010  Chen et al.
2007/0135989 A1*  6/2007  Hengst ................... G08G 1/163
                                              701/117

(Continued)

FOREIGN PATENT DOCUMENTS

CN       107155170 A       9/2017
EP       3122092 A1  *    1/2017
KR       100954232 B1  * 12/2007   ............ B60W 30/08

OTHER PUBLICATIONS

English Machine Translation of KR100954232B1 (Year: 2007).*
(Continued)

*Primary Examiner* — Andrew J Cromer
(74) *Attorney, Agent, or Firm* — Jeffri A. Kaminski;
Venable LLP

(57) ABSTRACT

A computer-implemented method for controlling a vehicle
communication network comprising a plurality of nodes at
a site, where at least some of the nodes are vehicles
operating at the site. The method includes obtaining envi-
ronment data indicative of a geometry of the site; obtaining
position data indicative of respective positions of the nodes;
modelling respective communication channels between
interconnected nodes in the vehicle communication network
based on the environment data and the position data; esti-
mating respective signal quality metrics indicative of a
communication link quality between the respective inter-
connected nodes based on the modelled communication
channels; and controlling relative positions of the vehicles at
the site based on the signal quality metrics and on a
pre-determined signal quality acceptance criterion.

13 Claims, 3 Drawing Sheets

(51) Int. Cl.
*H04B 17/309* (2015.01)
*H04W 24/08* (2009.01)
*H04W 84/00* (2009.01)

(52) U.S. Cl.
CPC ......... *G05D 1/0257* (2013.01); *G05D 1/0278* (2013.01); *H04W 84/005* (2013.01)

(56) References Cited

U.S. PATENT DOCUMENTS

| | | |
|---|---|---|
| 2019/0065649 A1 | 2/2019 | Slutzky et al. |
| 2020/0005650 A1 | 1/2020 | Park |
| 2022/0099789 A1* | 3/2022 | Abrudan ............... G01S 5/0289 |

OTHER PUBLICATIONS

Extended European Search Report in corresponding European Application No. 22155592.3 dated Jul. 27, 2022 (7 pages).
European Communication Pursuant to Article 94(3) dated Sep. 27, 2023 in corresponding European Patent Application No. 22155592. 3, 4 pages.
European Communication pursuant to Article 94(3) EPC dated Jan. 17, 2024 in corresponding European Patent Application No. 22155592. 3, 5 pages.
European Communication pursuant to Article 94(3) EPC dated Jun. 3, 2025 in corresponding European Patent Application No. 22155592. 3, 4 pages.
European Communication pursuant to Article 94(3) EPC dated Jan. 27, 2026 in corresponding European Patent Application No. 22155592. 3, 4 pages.

\* cited by examiner

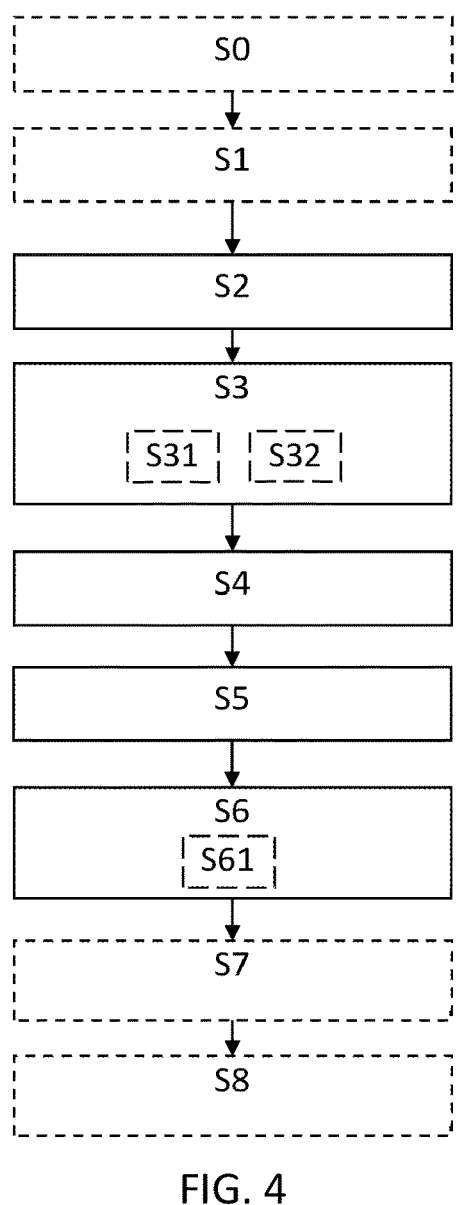
FIG. 4
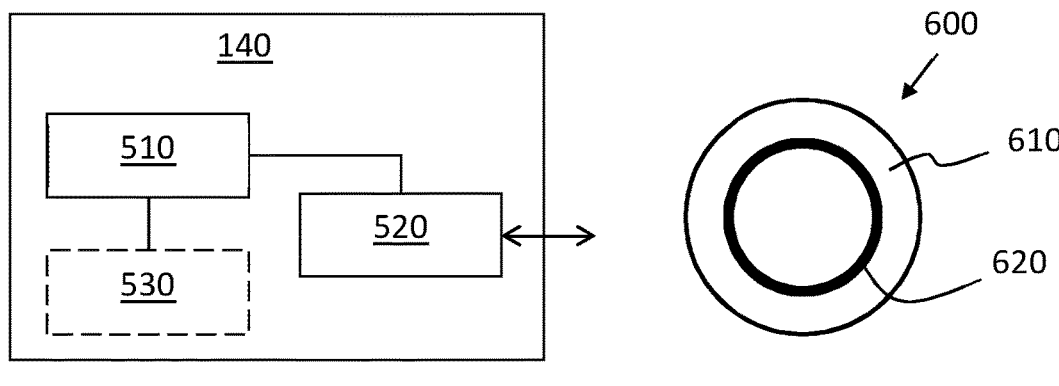
FIG. 5                    FIG. 6

AD HOC VEHICLE NETWORK SYSTEM

TECHNICAL FIELD

The present disclosure relates to ad hoc vehicle networks for autonomous driving systems, and in particular to controlling relative positions of the vehicles in such systems. Although the invention will be described mainly with respect to heavy-duty vehicles, the invention is not restricted to this particular type of vehicle but may also be used in other types of vehicles.

BACKGROUND

To operate autonomous vehicles at a site, such as a mine or a quarry, the vehicles can be controlled using a local wireless infrastructure distributed across the site. Wireless coverage should then be provided all over the site, such as inside tunnels and other remote spaces, since otherwise the vehicle control may be negatively affected. Consequently, physical network deployments inside tunnels are usually necessary, which are costly and requires time consuming installments. Additionally, this type of infrastructure may require access to spectrum licenses or private networks in case standard cellular/telecom technologies are used.

Vehicular ad hoc networks (VANETs) may alternatively be used instead of a local wireless infrastructure. VANETs are decentralized wireless networks which do not depend on a pre-existing wireless infrastructure, e.g., a system of fixed access points. In a VANET, each node (e.g., a vehicle) is capable of routing data. In other words, the network comprises interconnected vehicles. The specific nodes which forward data can be updated dynamically based on the situation.

There is a continuing need for further improvements in vehicle networks comprising interconnected vehicles.

SUMMARY

It is an object of the present disclosure to provide improved vehicle networks. This object is at least in part achieved by a computer-implemented method for controlling a vehicle communication network comprising a plurality of nodes at a site, where at least some of the nodes are integrated in vehicles operating at the site. The method comprises: obtaining environment data indicative of a geometry of the site; obtaining position data indicative of respective positions of the nodes at the site; modelling respective communication channels between interconnected nodes in the vehicle communication network based on the environment data and the position data; estimating respective signal quality metrics indicative of a communication link quality between the respective interconnected nodes based on the modelled communication channels; and controlling relative positions of the vehicles at the site based on the signal quality metrics and on a pre-determined signal quality acceptance criterion.

The proposed method provides an improvement in connectivity for vehicles operating at a remote site such as a mine or quarry where other connectivity solutions may be lacking. By using both geometrical data related to the site and position data of the vehicles, a model of the radio propagation channel in between any two vehicles can be determined, which model is then used to ensure that the vehicle relative positions are maintained in a state that allows connectivity to be maintained. Thus, the environment data and the channel models can be used to ensure that the relative distance between a pair of nodes does not reach a critical level which results in a drop in connectivity. Therefore, the proposed method ensures that the connectivity of the vehicle network is always maintained.

According to aspects, the controlling of relative positions comprises modifying a distance between the two interconnected nodes if the signal quality metric does not meet the pre-determined signal quality acceptance criterion. This enables a simple implementation to ensure connectivity in the vehicle network.

According to aspects, the position data is obtained using a global navigation satellite system. This provides accurate positions.

According to aspects, the position data is obtained using dead reckoning from a reference location. This can provide location information when satellite based positioning methods are not possible.

According to aspects, the environment data is based on collecting vehicle sensor data of the site. Such sensor can be existing sensors on the vehicles, such as radar, lidar, cameras etc. Thus, the topology map can be obtained from data collected from existing vehicles without any additional costly equipment.

According to aspects, the method comprises determining a number of vehicles required for desired coverage of a predetermined section of the site. This enables maintained connectivity across the section of the site.

According to aspects, the method comprises controlling which vehicle is connected to which based on the signal quality metrics and on the pre-determined signal quality acceptance criterion. This way, the vehicle communication network can be dynamically reconfigured for maintaining network performance.

According to aspects, inter-vehicle communication is based on radar transmission. This way, existing hardware on the vehicles can be used for the vehicle network, which saves costs.

According to aspects, the method comprises adapting an antenna beam of at least one vehicle based on the signal quality metric. This can improve the maintenance of connectivity between vehicles, e.g., in situations where there is no line of sight between the two vehicles.

According to aspects, one node of the vehicle communication network is an access point comprised in a separate wireless communication network. This way, all nodes in the vehicle communication network may access the separate wireless communication network via the vehicle communication network. This may facilitate deployment since access to a remote control unit could then be partly based on existing equipment.

There is also disclosed herein a computer program comprising program code means for performing the steps of the method discussed above when said program is run on a computer or on processing circuitry of a control unit.

There is also disclosed herein a computer program product comprising a computer program according to the discussion above, and a computer readable means on which the computer program is stored.

There is also disclosed herein a control unit for controlling a vehicle communication network comprising a plurality of nodes at a site, where at least some of the nodes are vehicles operating at the site. The control unit comprises: processing circuitry; a network interface coupled to the processing circuitry; and a memory coupled to the processing circuitry. The memory comprises machine readable computer program instructions that, when executed by the processing circuitry, causes the control unit to: obtain environment data indicative of a geometry of the site; obtain position data indicative of respective positions of the nodes; model respective communication channels between interconnected nodes in the vehicle communication network based on the environment data and the position data; estimate respective signal quality metrics indicative of a communication link quality between the respective interconnected nodes based on the modelled communication channels; and control relative positions of the vehicles at the site based on the signal quality metrics and on a predetermined signal quality acceptance criterion.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 4 is a flow chart illustrating a method;
FIG. 5 schematically illustrates a control unit;
and
FIG. 6 shows an example computer program product.

DETAILED DESCRIPTION OF EXAMPLE EMBODIMENTS OF THE INVENTION

Figure 1:
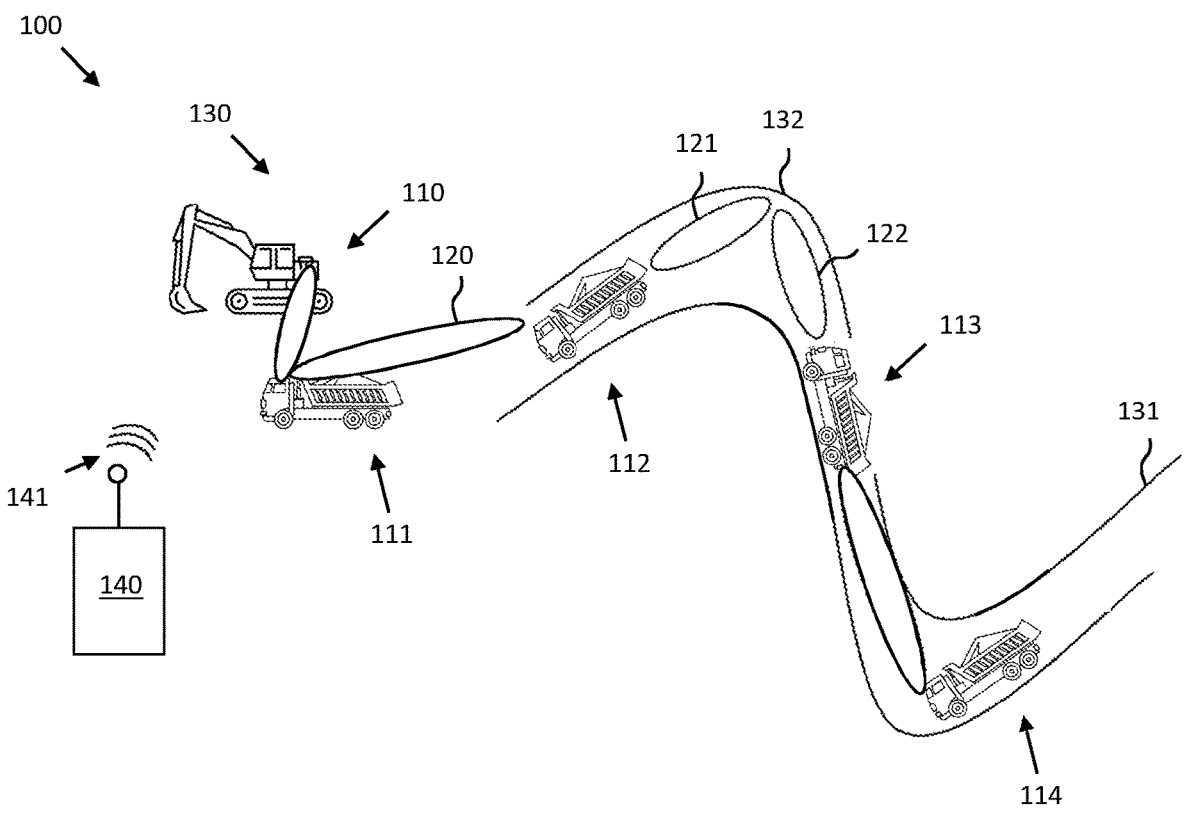
FIG. 1 shows example vehicle network at a site.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

As mentioned, there is a need for improved vehicle communication networks comprising interconnected vehicles. Therefore, there is herein disclosed a computer-implemented method for controlling connectivity in a vehicle communication network. The disclosed methods and apparatuses disclosed herein are particularly suitable for vehicular ad hoc networks (VANETs) but is applicable to any network of interconnected vehicles. The vehicle network in the disclosed method comprises at least two interconnected vehicles. Normally, however, the vehicle communication network comprises several more vehicles in the network, e.g., more than ten vehicles. The vehicle network may additionally comprise other types of nodes than vehicles. For example, the vehicle communication network may comprise a fixed node for communication with a remote control unit. This is discussed in more detail below.

FIG. 1 shows a plurality of interconnected vehicles 110, 111, 112, 113, 114 operating at a site 130 such as a mine or a quarry. An excavator 110 digs at a location and four heavy-duty vehicle combinations 111, 112, 113, 114 are platooning for cargo transport of the excavated material. The vehicle 111 is approaching the excavator 110 and the vehicles 112, 113, 114 are driving through a tunnel 131. In the figure, all vehicles are wirelessly connected through a daisy chain, i.e., each vehicle is connected to one or two other vehicles to form a chain. In other words, the vehicles constitute a number of interconnected node pairs. For example, vehicle 111 forms an interconnected node pair with vehicle 110 and forms another interconnected node pair with vehicle 112. In general, however, a node can be connected to any number of other nodes.

A remote control unit 140 controls the vehicle communication network and is normally wirelessly connected to a at least one vehicle in the plurality of vehicles and can in that case be seen as a node in the vehicle communication network. The control unit 140 can communicate to any of the vehicles among the interconnected vehicles through the vehicle communication network 100. Furthermore, the control unit may be arranged on one of the vehicles or distributed across a plurality of vehicles and/or also distributed across one or more remote units. The remote units may be based in a server remote from the site 130.

The control unit 140 may, e.g., form part of a site control center, adapted to control various operations at a work site such as a mine or a quarry.

Figure 3:
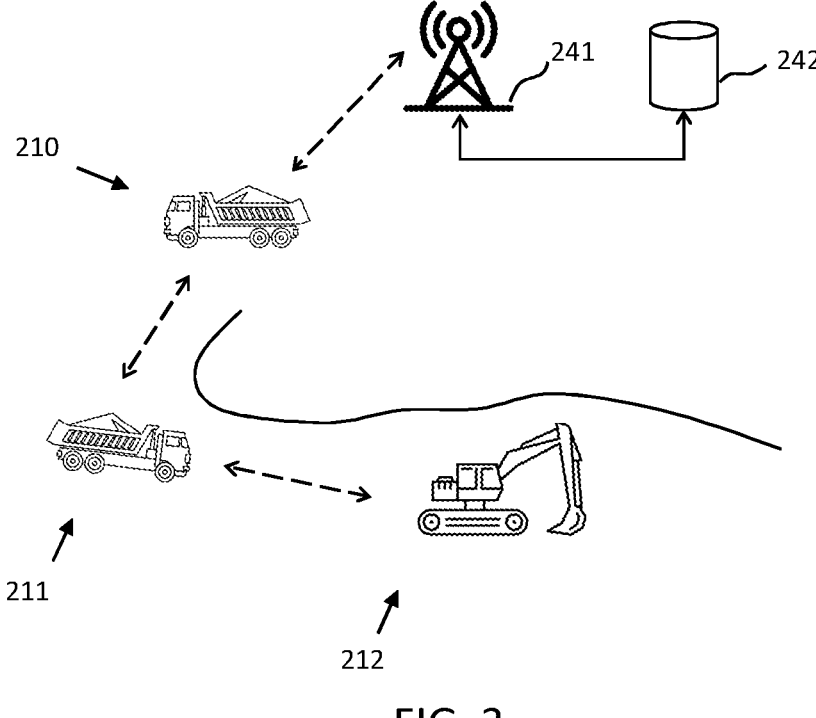
FIG. 3 shows example vehicle network at a site.

The wireless technology for the interconnected vehicles in the vehicle network can be some existing short-range wireless technology, such as IEEE 802.11, ultra-wideband (UWB), vehicle to everything (V2X), LIFI, radar transmission etc. However, any technology/standard is possible. The connection between the control unit and one vehicle may use the same technology as the connection between vehicles or it may use some other technology. For example, the control unit may be connected via an access point of a fifth generation network (5G). Such an example is shown in FIG. 3. In particular, FIG. 3 shows vehicles 210, 211, 212 which are interconnected in a vehicle communication network. Vehicle 210 is connected to an access point 241, which is a node in the network and is in turn is connected to a remote server 242 comprising the control unit 140. In general, one node of the vehicle communication network 100 can be an access point comprised in a separate wireless communication network.

The vehicles 110, 111, 112, 113, 114 are preferably at least partly autonomous. The control unit can send drive instructions, such as "increase velocity" or "brake", to the vehicles through the vehicle network. Such instructions may be executed autonomously and/or by an operator.

Figure 2:
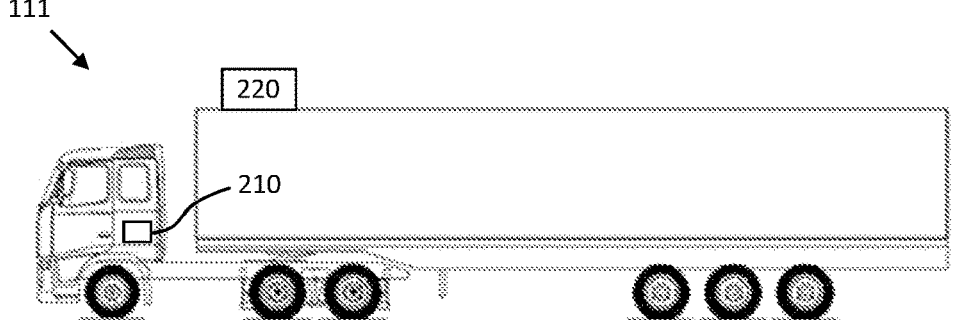
FIG. 2 shows an example heavy-duty vehicle.

FIG. 2 illustrates an example heavy-duty vehicle combination 111 for cargo transport. The vehicle combination 111 comprises a truck or towing vehicle configured to tow a trailer unit in a known manner, e.g., by a fifth wheel connection. The combination further comprises a communication unit 220 using some wireless technology and a local control unit 210 for, i.a., controlling motion of the vehicle combination.

Herein, a heavy-duty vehicle 100 is taken to be a vehicle designed for the handling and transport of heavier objects or large quantities of cargo. As an example, a heavy-duty vehicle could be a semi-trailer vehicle, or a truck as described above. As another example, a heavy-duty vehicle could be a vehicle designed for use in construction, mining operations, and the like. It is appreciated that the techniques and devices disclosed herein can be applied together with a wide variety of vehicle units, not just those exemplified in FIGS. 1 and 2.

It is desired that the nodes in the vehicle communication network always, or at least most of the time, maintain connectivity to the vehicle communication network. This means a single node should be interconnected with another node which is connected to the vehicle communication network. In other words, the single node should maintain a communication link to the other node which is connected to the rest of the network. If one node drops connectivity to the network, the control unit may perhaps not be capable of communicating with all vehicles. For example, if vehicle 113 in FIG. 1 loses connectivity to vehicle 112, the control unit 140 can no longer communicate with vehicles 113 or 114, if the control unit is wirelessly connected to vehicle 110.

To maintain connectivity in the vehicle communication network, the nodes in an interconnected node pair, i.e., a pair which has an established communication link, should remain within a range of each other such that communication can be maintained. Each vehicle has an instantaneous coverage area, where it can wirelessly communicate with another node as long as this other node is located within the instantaneous coverage area. This instantaneous coverage changes over time since the vehicle is moving throughout the site, where different parts of the site may have different propagation characteristics for wireless signals. Thus, there is an instantaneous maximum allowable distance between two nodes that enables wireless communication with a predetermined fidelity, which changes as the vehicles are moving.

To summarize, as is shown in FIG. 4, there is herein disclosed a computer-implemented method for controlling a vehicle communication network 100 comprising a plurality of nodes at a site 130, where at least some of the nodes are vehicles 110, 111, 112, 113, 114 operating at the site. The method comprises: obtaining S2 environment data indicative of a geometry of the site 130; obtaining S3 position data indicative of respective positions of the nodes; modelling S4 respective communication channels between interconnected nodes in the vehicle communication network 100 based on the environment data and the position data; estimating S5 respective signal quality metrics indicative of a communication link quality between the respective interconnected nodes based on the modelled communication channels; and controlling S6 relative positions of the vehicles 110, . . . , 114 at the site 130 based on the signal quality metrics and on a pre-determined signal quality acceptance criterion.

In other words, there is a set of communication links in the vehicle communication network that should be maintained, at least during some time period. These links are maintained by controlling relative positions of the vehicles.

Modern vehicles, autonomous vehicles in particular, normally have different types of integrated sensors for operating the vehicles. Such sensors can, e.g., be lidar, radar, cameras etc. The environment data of the disclosed method may be based on collecting S0 data of the site from such sensors. The environment data is indicative of a geometry of the site 130 and may comprise two- or three-dimensional structural data of the site generated from the sensor data. For example, the environment data may comprise a map similar to a topography map which indicates walls of tunnels and other objects that may affect signal propagation. In a more detailed example, the environment data comprises polygon mesh of the geometry, which could be generated from cloud point data from a lidar. Sensor data from a global navigation satellite system (GNSS), such as, e.g., global positioning system (GPS) or Galileo, could also be used to map information such as elevation to the environment data. The environment data may be based on one or more test runs of the vehicle operation, i.e., dry runs, and/or be constantly updated by a continuous collection of data from the sensors.

The environment data may additionally comprise geometry information of the vehicles since the vehicles themselves may affect signal propagation. Furthermore, signal propagation may be affected by where on the vehicle the antenna is located.

The position data is indicative of respective positions of the vehicles at the site. The position data can comprise absolute positions or it can comprise data indicating proximity to a known reference point. Furthermore, the position data may be obtained S31 using a GNSS. However, such systems may be less suitable inside tunnels etc. Therefore, the position data may be obtained S32 using dead reckoning from a reference location or from some type of indoor localization system, such as a beacon-based localization system. The dead reckoning can use many different types of vehicle sensors such as wheel speed sensor, rotation sensors etc. The reference location may be obtained from GNSS system. The reference location and/or absolute position can also be obtained by other means, such as reference beacons or structures/landmarks, or in other ways.

When the positions of the vehicles are known, it is possible to model respective communication channels between interconnected nodes in the vehicle communication network based on the environment data. It is assumed that the position of any fixed node in the communication network is already known. Thus, the characteristics of how signals propagate across the various communication links in the vehicle communication network can be estimated.

A channel model can be seen as mathematical representation of the effects on a signal propagating through a communication channel. Many types of channel models exist. A simple channel model is to only account for path loss, without applying any filtering to the propagated signal. Purely stochastic channel models account for multi path fading channels without considering the geometry of the link. Spatial models account for various angles, such as angles of departure and of arrival. Ray tracing models account for exact locations of scatterers and is especially suitable for environment such as indoors or tunnels.

In an example embodiment, the environment data comprises a 3D representation of tunnel at the site. The channel model is calculated between two nodes, where propagation characteristics such as reflections on tunnel walls are accounted for.

With the channel model, a signal quality metric can be estimated. In an example, the channel model is a real-valued number representing pathloss across a distance between the two vehicles. The signal quality metric can in that case be a received signal strength, which can be obtained by applying the pathloss on a transmitted signal strength. In general, the signal quality metric can be any performance metric or combination of metrics of a signal propagating across the communication channel. Another example is bit error rate, or similar metrics representing signal fidelity. The predetermined signal quality acceptance criterion can in these cases be a threshold number such as signal strength of at least −80 dBm, a bit error rate of less than 1% etc.

As mentioned, the channel model can have different degrees of complexity. Furthermore, it is possible that various signals used by a node transmitter have various characteristics, such as different modulation schemes, different power levels, different beam directions etc. Therefore, margins may be applied in various ways. For example, the estimated signal quality metric may be offset to account for model inaccuracies. Furthermore, a worst case scenario could be assumed for signal characteristics. For example, if different power levels are used for transmission, the lowest transmitted power could be used in the disclosed method to account for the worst case scenario.

In example scenario, the site comprises a first section with a tunnel and a second section which is outdoors. The environment data comprises a 3D mesh representation of site. The channel model is a ray tracing model and generates a path loss for the channel. After applying margins, a maximum allowable distance between vehicles in the vehicle communication network is 50 meters when both vehicles are inside a tunnel and 100 meters otherwise.

If the performance metric indicates that a communication link between the two nodes cannot be maintained with sufficient fidelity, i.e., the link fails to meet a pre-determined signal quality acceptance criterion, it is likely that reducing the distance between the two nodes will improve fidelity since the received signal power will increase. However, sometimes a vehicle can be located in a connectivity blind spot with respect to the other node in the link. Therefore, the relative positions of nodes is in general changed based on the signal quality metric in the disclosed method. This can, e.g., mean that the control unit 140 sends instructions to one or more vehicles to change velocity to reduce or to increase the distance between the two nodes. In other words, the controlling of relative positions may comprise modifying S61 a distance between two interconnected nodes (where at least one of them is a vehicle) if the corresponding signal quality metric does not meet the pre-determined signal quality acceptance criterion.

According to an example situation in FIG. 1, the communication link between vehicle 113 and vehicle 114 fails to meet the pre-determined signal quality acceptance criterion. All other communication links pass the signal quality acceptance criterion. Therefore, the control unit 140 sends a control signal via the vehicle communication network 100 to vehicle 114 to increase its speed.

There may be scenarios where the signal quality metric of one communication link could be improved at the cost of reducing the single quality parameter of another link, which is undesired. This could happen, e.g., if vehicle 113 in FIG. 1 is instructed to increase its speed. Such scenario may be avoided if all vehicles in the network is treated as two sets, where all vehicles in the same set are controlled to maintain current relative distances between each other. For example, to improve the communication link between vehicle 112 and 113 in FIG. 1, vehicle 112 and all vehicles ahead of it could be controlled to slow down. Alternatively, or in combination of, vehicle 113 and all vehicles behind it could be controlled to speed up.

According to aspects, there may be a predetermined list of nodes that must always be interconnected. For example, for vehicles are operating along a route, at least the vehicles in sequence could be required to always be interconnected via a daisy chain.

In an example scenario, the control unit 140 in FIG. 1 is a node of the vehicle network 100 that is wirelessly connected to vehicle 111, i.e., there is a communication link between the control unit 140 and vehicle 111. After some time, vehicle 111 drives further away from the control unit 140 and vehicle 112 is now closer to the control unit 140 compared to vehicle 111. In this case, it may be preferable to establish a communication link between the control unit and vehicle 112 and abandon the communication link between the control unit 140 and vehicle 111. Therefore, the disclosed method may comprise controlling S7 which node is connected to which based on the signal quality metrics and on the pre-determined signal quality acceptance criterion. For example, if the control unit detects the signal quality metric of the connection between itself 140 and vehicle 111 is dropping, the control unit may scan for a connection with higher quality and if it finds one, drop the connection to vehicle 111, and switch to the new connection to vehicle 112.

In the example scenario above, the control unit is stationary at the site 130. A vehicle in the network may also be more or less stationary relative to the other vehicles. An example of such relatively stationary vehicle could be the excavator 110 in the figure. Which of the faster-moving heavy-duty vehicles that are directly connected to the excavator 110 may be determined in a similar way as the example scenario above.

Along the traveled route, there may be locations where there is no line of sight between the two vehicles, e.g., at corners around a structure or in a tunnel. Therefore, the communication unit may adapt the transmitted/received beam in order to use local topology to direct the signal path. As an example, a signal can be directed to a wall section, e.g., to be reflected to a direction of the other vehicle around the corner 132. An example of this is shown between vehicles 112 and 113 in FIG. 1. In other words, the method may comprise adapting S8 an antenna beam 120, 121, 122 of at least one vehicle 110, . . . , 114 based on the signal quality metric.

According to aspects, the method comprises determining S1 a number of vehicles 110, . . . , 114 required for desired coverage of a predetermined section of the site 130. Using the topology of the site, the number of vehicles necessary to maintain a connected network can be determined. For example, different numbers of vehicles can be simulated operating at the site and the maintenance of the vehicle communication network can be simulated using the channel modeling discussed above over time. It the network cannot be maintained across the predetermined section of the site 130, the number of vehicles could be increased, and the scenario could be simulated again.

FIG. 5 schematically illustrates, in terms of a number of functional units, the components of a control unit 140 according to embodiments of the discussions and methods disclosed herein. Processing circuitry 510 is provided using any combination of one or more of a suitable central processing unit CPU, multiprocessor, microcontroller, digital signal processor DSP, etc., capable of executing software instructions stored in a computer program product, e.g., in the form of a storage medium 530. The processing circuitry 510 may further be provided as at least one application specific integrated circuit ASIC, or field programmable gate array FPGA.

Particularly, the processing circuitry 510 is configured to cause the control unit 140 to perform a set of operations, or steps, such as the methods discussed in connection to FIG. 4. For example, the storage medium 530 may store the set of operations, and the processing circuitry 510 may be configured to retrieve the set of operations from the storage medium 530 to cause the control unit 140 to perform the set of operations. The set of operations may be provided as a set of executable instructions. Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The control unit 140 may further comprise an interface 520 for communications with at least one external device, such as one or more of the interconnected vehicles 110, 111, 112, 113, 114. As such the interface 520 may comprise one or more transmitters and receivers, comprising analogue and digital components and a suitable number of ports for wireline or wireless communication.

The processing circuitry 510 controls the general operation of the control unit 140, e.g., by sending data and control signals to the interface 520 and the storage medium 530, by receiving data and reports from the interface 520, and by retrieving data and instructions from the storage medium 530. Other components, as well as the related functionality, of the control node are omitted in order not to obscure the concepts presented herein.

The functional units of FIG. 5 may also be comprised in a vehicle control unit 210, such as a control unit for performing one or more of the functions discussed above in connection to FIG. 4.

FIG. 6 illustrates a computer readable medium 610 carrying a computer program 620 comprising program code means for performing, e.g., the methods illustrated in FIG. 4, when said program product is run on a computer. The computer readable medium and the code means may together form a computer program product 600.

The invention claimed is:

1. A computer-implemented method for controlling a vehicle communication network comprising a plurality of nodes at a site, where at least some of the nodes are integrated in vehicles operating at the site and wherein the vehicles constitute one or more interconnected node pairs in a daisy chain, the method comprising:

obtaining environment data indicative of a geometry of the site;

obtaining position data indicative of respective positions of the nodes at the site;

modelling respective communication channels between interconnected nodes in the vehicle communication network based on the environment data and the position data;

estimating respective signal quality metrics indicative of a communication link quality between the respective interconnected nodes based on the modelled communication channels, wherein the signal quality metrics represent a signal fidelity; and controlling relative positions of the vehicles at the site based on the signal quality metrics and on a pre-determined signal quality acceptance criterion in the form of a predetermined fidelity, wherein the controlling of relative positions comprises sending instructions to one or more vehicles to change velocity to reduce or to increase the relative distance between the one or more interconnected node pairs if the respective signal quality metric does not meet the pre-determined signal quality acceptance criterion.

2. The method according to claim 1, wherein the position data is obtained using a global navigation satellite system.

3. The method according to claim 1, wherein the position data is obtained using dead reckoning from a reference location.

4. The method according to claim 1, wherein the environment data is based on collecting vehicle sensor data of the site.

5. The method according to claim 1, comprising determining a number of vehicles required for desired coverage of a predetermined section of the site.

6. The method according to claim 1, comprising controlling which node is connected to which based on the signal quality metrics and on the pre-determined signal quality acceptance criterion.

7. The method according to claim 1, wherein inter-vehicle communication is based on radar transmission.

8. The method according to claim 1, comprising adapting an antenna beam of at least one vehicle based on the signal quality metric.

9. The method according to claim 1, wherein one node of the vehicle communication network is an access point comprised in a separate wireless communication network.

10. A non-transitory computer readable medium storing program code for performing claim 1 when said program code is run on a computer or on processing circuitry of a control unit.

11. A control unit for controlling a vehicle communication network comprising a plurality of nodes at a site, where at least some of the nodes are vehicles operating at the site, and wherein the vehicles constitute one or more interconnected node pairs in a daisy chain, the control unit comprising: processing circuitry; a network interface coupled to the processing circuitry; and a memory coupled to the processing circuitry, wherein the memory comprises machine readable computer program instructions that, when executed by the processing circuitry, causes the control unit to:

obtain environment data indicative of a geometry of the site;

obtain position data indicative of respective positions of the nodes;

model respective communication channels between interconnected nodes in the vehicle communication network based on the environment data and the position data;

estimate respective signal quality metrics indicative of a communication link quality between the respective interconnected nodes based on the modelled communication channels, wherein the signal quality metrics represent a signal fidelity; and control relative positions of the vehicles at the site based on the signal quality metrics and on a pre-determined signal quality acceptance criterion, by sending instructions to one or more vehicles to change velocity to reduce or to increase the relative distance between the one or more interconnected node pairs if the respective signal quality metric does not meet the pre-determined signal quality acceptance criterion.

12. A vehicle comprising the control unit according to claim 11.

13. A site control center comprising the control unit according to claim 11.

* * * * *